US008205799B2

(12) United States Patent
Squibbs et al.

(10) Patent No.: US 8,205,799 B2
(45) Date of Patent: Jun. 26, 2012

(54) PHYSICAL OBJECT WITH MEMORY TAG AND APPARATUS FOR USE WITH SUCH OBJECTS

(75) Inventors: Robert Francis Squibbs, Bristol (GB); Richard Anthony Lawrence, S. Glos (GB)

(73) Assignee: Hewlett-Packard Development Company, L.P., Houston, TX (US)

( * ) Notice: Subject to any disclaimer, the term of this patent is extended or adjusted under 35 U.S.C. 154(b) by 1399 days.

(21) Appl. No.: 11/035,802

(22) Filed: Jan. 14, 2005

(65) Prior Publication Data
US 2005/0172216 A1 Aug. 4, 2005

(30) Foreign Application Priority Data

Jan. 30, 2004 (GB) ................................. 0402024.4

(51) Int. Cl.
*G06K 19/06* (2006.01)
(52) U.S. Cl. ........................................ 235/492; 235/385
(58) Field of Classification Search .................... 235/492
See application file for complete search history.

(56) References Cited

U.S. PATENT DOCUMENTS

| 4,476,468 A | 10/1984 | Goldman ...................... 340/5.86 |
| 4,630,845 A | 12/1986 | Sanner ............................. 283/91 |
| 4,663,612 A | 5/1987 | Mejia et al. ................. 340/572.4 |
| 5,418,865 A * | 5/1995 | Bloomberg .................... 382/312 |
| 5,434,917 A | 7/1995 | Naccache et al. ............. 713/176 |
| 5,689,238 A | 11/1997 | Cannon et al. |
| 6,008,727 A | 12/1999 | Want et al. |
| 6,297,727 B1 | 10/2001 | Nelson |
| 6,472,976 B1 | 10/2002 | Wohl .......................... 340/10.41 |
| 6,843,419 B2 * | 1/2005 | Rathus et al. ............. 235/462.15 |
| 6,964,374 B1 * | 11/2005 | Djuknic et al. ........... 235/462.01 |
| 7,010,647 B1 * | 3/2006 | Karamchetty et al. ........ 711/115 |
| 7,023,344 B2 | 4/2006 | Schapper |
| 7,121,462 B2 * | 10/2006 | Keronen et al. ............... 235/380 |
| 7,170,391 B2 | 1/2007 | Lane et al. |
| 2001/0051329 A1 * | 12/2001 | Lynch et al. .................. 434/317 |
| 2002/0145623 A1 * | 10/2002 | Decombe ...................... 345/734 |
| 2002/0170973 A1 | 11/2002 | Teraura ........................ 235/492 |

(Continued)

FOREIGN PATENT DOCUMENTS

EP 1 398 711 A1 3/2004
(Continued)

OTHER PUBLICATIONS

Finkenzeller, K., "Fundamental Operating Principles," *RFID Handbook: Fundamentals and Applications in Contactless Smart Cards and Identification*, Ch. 3, 31 pages (2003).
*Texas Instruments Registration and Identification System General Reference Manual*, Texas Instruments, 32 pages (Oct. 4, 1999).
Http://www.m-w.com/dictionary, p. 1.

*Primary Examiner* — Steven S Paik
*Assistant Examiner* — Tae Kim (57) ABSTRACT

A physical object is provided that comprises a base medium, such as a paper sheet, and a memory tag embedded in it or attached to it. The memory tag stores at least one data item and location data relating each of one or more areas on the object's surface to a corresponding data item. Preferably, the data item or items stored by the tag comprise a print data item representing an item printed on the object, and/or a meta data item representing an instruction, or data to be output, in response to user selection of the corresponding area on the object's surface. Apparatus is provided for writing the data items and location data to the memory tag; apparatus is also provided for subsequently using the location data for interpreting user selections made by indicating positions on the object.

22 Claims, 7 Drawing Sheets

U.S. PATENT DOCUMENTS

| | | | |
|---|---|---|---|
| 2003/0107529 A1* | 6/2003 | Hayhurst et al. | 345/1.1 |
| 2003/0170604 A1* | 9/2003 | Mullen | 434/317 |
| 2004/0044956 A1* | 3/2004 | Huang | 715/511 |
| 2004/0078749 A1 | 4/2004 | Hull et al. | |
| 2004/0092311 A1* | 5/2004 | Weston et al. | 463/42 |
| 2004/0099743 A1* | 5/2004 | Waters | 235/491 |
| 2004/0100358 A1* | 5/2004 | Waters et al. | 340/5.1 |
| 2004/0230887 A1* | 11/2004 | Sellen et al. | 715/500.1 |
| 2005/0058483 A1* | 3/2005 | Chapman et al. | 400/76 |

FOREIGN PATENT DOCUMENTS

| | | |
|---|---|---|
| JP | 2002120475 A | 4/2002 |
| WO | 82/00062 | 1/1982 |
| WO | 01/26032 A1 | 4/2001 |

* cited by examiner

PHYSICAL OBJECT WITH MEMORY TAG AND APPARATUS FOR USE WITH SUCH OBJECTS

RELATED APPLICATION

The subject matter of the present application is related to the disclosure of U.S. patent application Ser. No. 11/035,801 filed Jan. 14, 2005 entitled "Physical Object with Memory Tags and Apparatus for Writing and Using Such Objects" which is assigned to the assignee of this application.

FIELD OF THE INVENTION

The present invention relates to a physical object with a memory tag embedded in or attached to it, and apparatus for writing and using such objects; in particular, but not exclusively, the physical objects concerned are printable/printed sheet objects.

BACKGROUND OF THE INVENTION

Memory tags in the form of Radio Frequency Identification (RFID) tags are well known in the prior art. RFID tags come in many forms but all comprise an integrated circuit on which in use information can be stored and a coil which enables it to be interrogated by a reader which also powers it by means of an inductive (wireless) link. Until recently RFID tags have been quite large, due to the frequency they operate at (13.56 MHz) and the size of coil they thus require, and have had very small storage capacities. Such RFID tags have tended to be used in quite simple applications, such as for file tracking within offices or in place of or in addition to bar codes for product identification and supply chain management.

Much smaller RFID tags have also been developed, operating at various frequencies. For example Hitachi-Maxell have developed "coil-on-chip" technology in which the coil required for the inductive link is on the chip rather than attached to it. This results in a memory tag in the form of a chip of 2.5 mm square, which operates at 13.56 MHz. This chip is capable of both being read and being written to. In addition Hitachi has developed a memory tag they call a "mu-chip" which is a chip of 0.4 mm square and operates at 2.45 GHz. This chip is written with data during the manufacturing process in Read-Only-Memory (ROM), but is small enough to be embedded in paper.

SUMMARY OF THE INVENTION

According to the first aspect of the present invention there is provided a physical object comprising a base medium with a memory tag embedded in it or attached to it, the memory tag storing at least one data item and location data relating each of one or more areas on the surface of the physical object to a respective data item stored by the memory tag.

Preferably, the data item or items stored by the tag comprise a print data item representing data printed on a surface of the physical object and/or a meta data item representing an instruction to be acted upon, or data to be output, in response to user selection of the corresponding area of the surface of the physical object.

The present invention also provides apparatus for writing the memory tag of an object with such data items and location data.

According to another aspect of the present invention, there is provided apparatus comprising:
a memory-tag read device for reading item data and location data from a memory tag embedded in or attached to a base medium of a physical object presented to the apparatus, the location data relating each of one or more areas on the surface of the object to a respective data item stored by the memory tag;
a user-selection arrangement for receiving user input indicative of a user-selected position on the object; and
a control arrangement arranged to use the location data read by the read device to identify the data item corresponding to a user-selected position indicated by user input to the user-selection arrangement.

BRIEF DESCRIPTION OF THE DRAWINGS

Embodiments of the invention will now be described, by way of non-limiting example only, with reference to the accompanying drawings, in which.

DETAILED DESCRIPTION OF THE PREFERRED EMBODIMENTS

Figure 1:
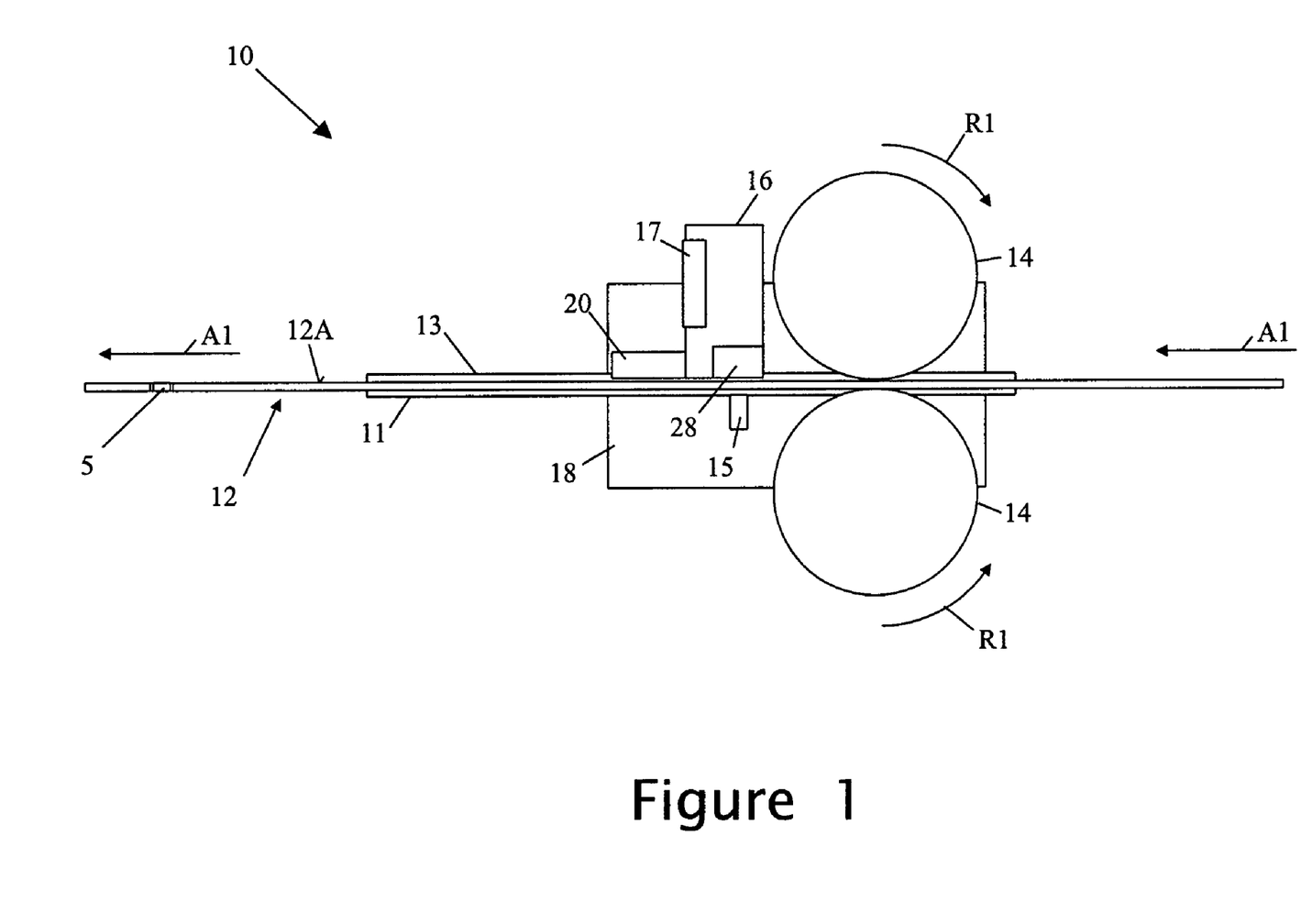
FIG. 1 is a diagrammatic side view of printer apparatus provided with a memory tag read/write device.
Figure 2:
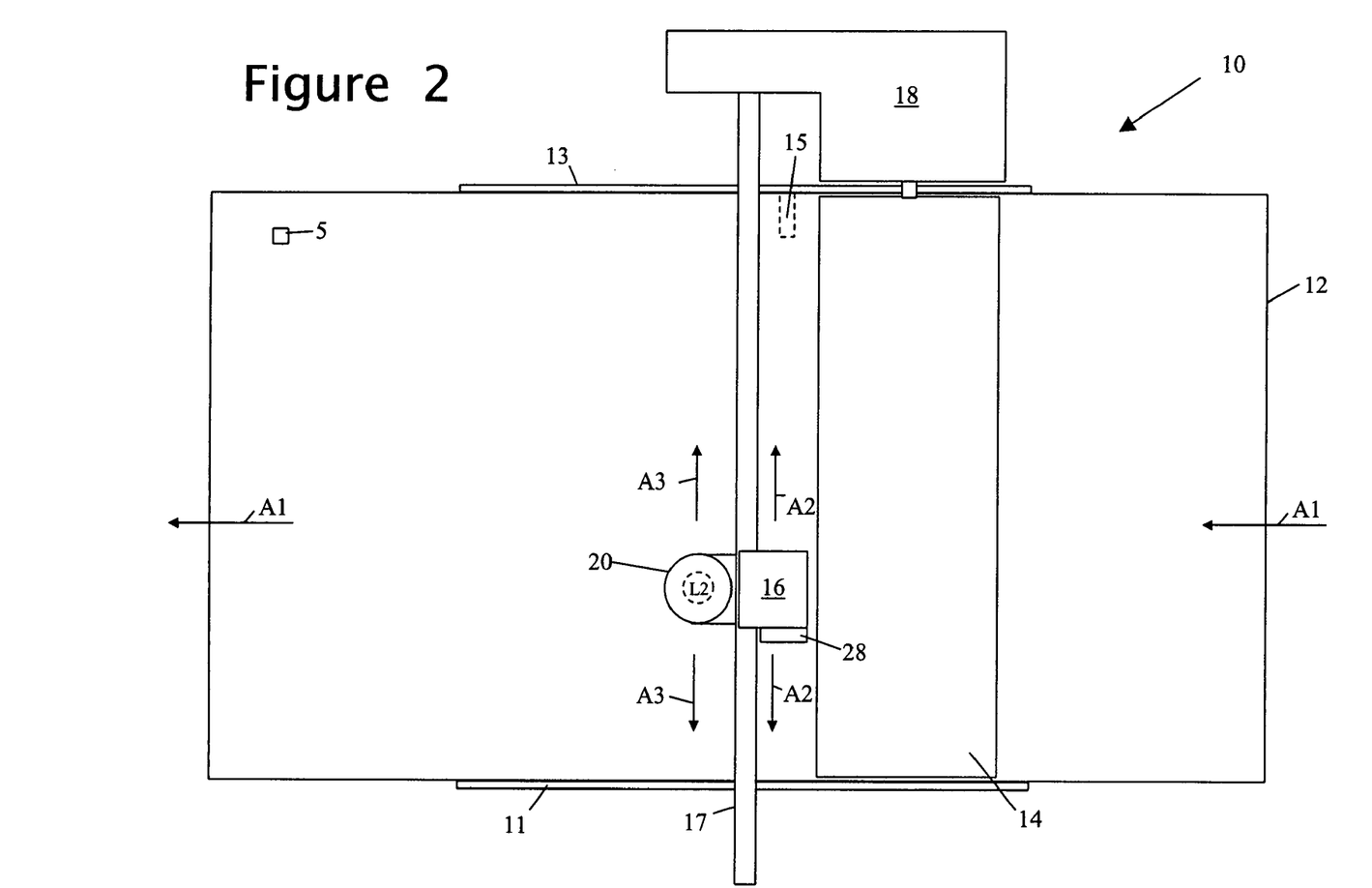
FIG. 2 is a diagrammatic plan view of the FIG. 1 apparatus.

Referring to FIGS. 1 and 2, apparatus 10 for printing onto a base medium and data writing to one or more memory tags in or on the base medium is illustrated. In the present example, the base medium takes the form of loose sheets 12, such as paper sheets, to which one or more memory tags 5 have been applied or within which one or more memory tags 5 have been embedded (in FIG. 1, a single memory tag 5 is depicted as embedded in the sheet 12). The memory tag or tags 5 are RFID memory tags for which the manner of writing data to the tags and reading data from the tags is well known (see for example the RFID Handbook, Klaus Finkenzeller, 1999, John Wiley & Sons). For simplicity only those parts of the apparatus 10 which need to be shown to describe the invention are illustrated and described. It will be understood that the apparatus 10 includes much known technology from the prior art of printers, and from the prior art of RFID memory tags, which is not described here.

The apparatus 10 comprises a platen 11 and paper feed rollers 14 which are driven, by drive mechanism 18, to rotate as indicated by arrows R1 to feed the sheets 12 across the platen 11 along a first axis in the direction indicated by arrows A1. The platen has an upstanding reference edge 13 for locating one edge of the sheet 12 as it is moved across the platen by the rollers 14. A leading edge sensor 15 embedded in the platen is arranged to sense the passing of the leading (and trailing) edges of the sheet 12.

The apparatus 10 further includes a print-head carriage 16 which carries a print head (not separately referenced) which in this example is of ink jet form. The print-head carriage 16 is mounted on a guide rail 17 which extends across the apparatus 10 substantially perpendicular to the axis A1. The print-head carriage 16 is moveable back and forth along the guide 17 in known manner by drive mechanism 18. Thus the print head is moveable back and forth along a second axis indicated by arrows A2, substantially perpendicular to the axis A1, to enable the print head to access most of the upper surface 12A of the paper sheet 12 as it moves through the apparatus 10, and thus to print anywhere on that accessible area of surface 12A as required.

The print-head carriage 16 also mounts a memory tag read/write device 20, and a marking sensor 28. The marking sensor 28 is operative to sense special markings applied to a sheet 12, such as markings made using an infrared-visible ink not visible to the normal human eye and not normally used by the print head; as will be more fully explained hereinafter, such markings are used to provide a way of inputting user selection data to the apparatus 10.

The memory tag read/write device 20 operates to write data to and/or read data from memory tags 5 as required using an inductive coil L2. Due to its mounting on the carriage 16, the inductive coil L2 of the memory tag read/write device 20 is moveable back and forth along a third axis indicated by arrows A3, substantially perpendicular to the axis A1, and parallel to the axis A2, to enable the memory tag read/write device 20 to read data from and/or write data to memory tags 5 located anywhere on or in the accessible area of the sheet 12.

Figure 3:
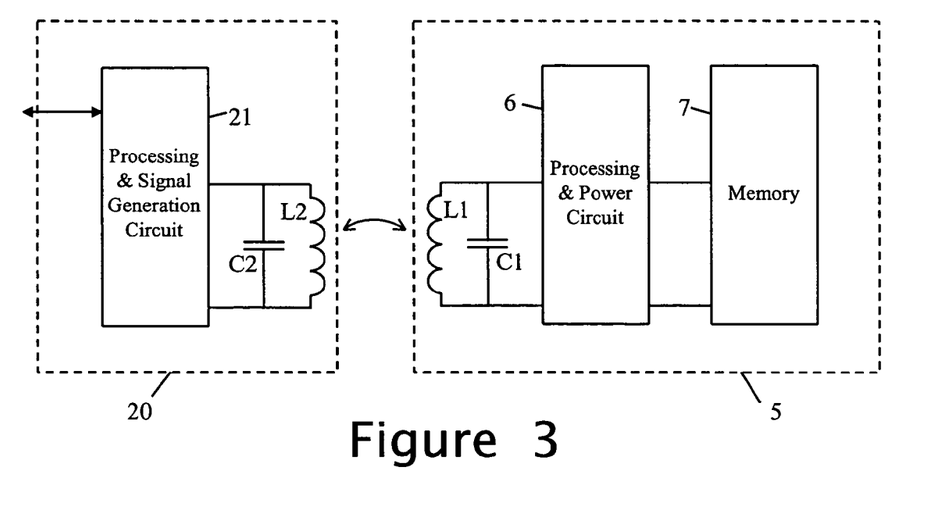
FIG. 3 is a diagram of a memory tag and the read/write device of the FIG. 1 apparatus.

Referring now to FIG. 3, the basic operation of a memory tag 5 and of the read/write device 20 will be described. A memory tag 5 includes an antenna coil L1 and a capacitor C1 connected in parallel therewith to form a resonant circuit. The tag 5 further includes a memory 7 and processing and power circuitry 6. The read/write device 20 includes an antenna coil L2 and a capacitor C2 in parallel therewith to form a resonant circuit, and a processing and signal generating circuitry 21.

A signal generator within circuitry 21 generates a signal at the chosen frequency, such as 2.45 GHz; this signal is applied to the antenna coil L2 and thus generates an electro-magnetic field which, provided the memory tag 5 is sufficiently close to the read/write device 20, penetrates the antenna coil L1 of the memory tag 5. By induction a voltage is thus generated in the antenna coil L1. This induced voltage is rectified in circuitry 6 and used to power the memory tag 5. The capacitance of the capacitors C1 and C2 is selected such that the resonant circuits are both resonant at the frequency generated by the signal generator, in order to maximise transmitted signal strength and received signal.

When data is to be written to the memory tag 5 by the read/write device 20 the radio frequency signal generated in circuitry 21 is modulated, e.g. amplitude modulated, with the data before being applied to the antenna coil L2 and transmitted. The signal received by the memory tag 5 by inductive coupling thus both powers the memory tag 5 and communicates with it, the circuitry 6 separating the data signal from the carrier and passing data for storage to the memory 7.

Similarly, if data is to be read from the memory tag 5 the circuitry 6 applies a signal indicative of the data to the antenna coil L1 which is detected, as a result of the inductive coupling, by antenna coil L2 and deciphered in circuitry 21 before being output from the read/write device 20. This signal may for example be transmitted using load modulation. In RFID systems such as this the power consumed by the memory tag 5 can be measured as a drop in voltage across the internal resistance of the antenna coil L2 of the read/write device 20. A load resistance within the circuitry 6 may be switched on and off, thus altering the power consumed by the memory tag 5 which is then detected as an amplitude modulation of the voltage across the antenna coil L2 of the read/write device 20.

Figure 4:
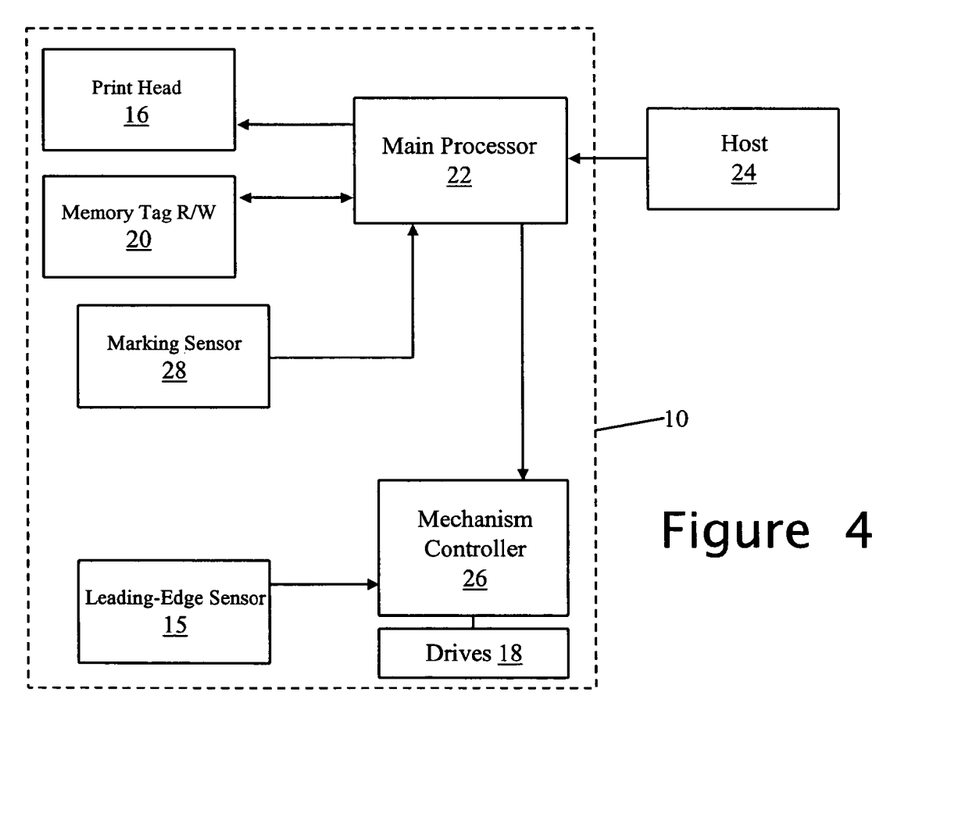
FIG. 4 is a block diagram of the functional components of the FIG. 1 apparatus.

Returning to a consideration of the printer apparatus 10 as a whole, FIG. 4 shows the main functional components in block diagram form. In addition to the components already described (namely, print head 16, memory tag read/write device 20, sensors 15 and 28, and drive mechanism 18), the apparatus includes a main processor 22, typically a program-controlled processor, arranged to receive input from an external device (such as a host computer 24), and a mechanism controller 26 for controlling the drive mechanism 18 to move the paper sheet 12 and the print-head carriage 16 as commanded by the main processor 22.

The mechanism controller 26 is arranged to position the print head over the sheet 12 at a position specified by the main processor 22 in standard units (such as millimeters) relative to a frame of reference established by the edges of the sheet (in particular, the sheet edge up against the reference edge 13 and the sheet leading edge as detected by sensor 15). As will be understood by persons skilled in the art, this is achieved by providing for the conversion of the units of measure provided by the processor 22 into the basic positioning units, such as stepping motor increments, used by the drive mechanism 18. This conversion utilises both scaling factors between standard measurement units and drive-mechanism units, and offset values. These offset values comprise a fixed offset value between the reference edge 13 and the drive mechanism position measure in the direction of axis A2 when the print head is aligned with the edge 13, and the value of the drive mechanism position measure in the direction of axis A1 when the sensor 15 detects the leading edge of the sheet 12.

In addition to responding to commands from the processor 22 to position the print head at a particular position over the sheet 12 relative to the sheet-edge frame of reference, the mechanism controller 26 is also arranged to respond to commands from the processor 22 to position either one of the memory tag read/write device 20 and the marking sensor 28 at a specified position above the sheet 12 relative to the sheet-edge frame of reference (it being appreciated that this simply involves the controller 26 positioning the print head at a position offset relative to specified position by an amount corresponding to the actual offset, relative to the print head, of the element 20 or 28 being positioned).

The main processor 22 receives data and instruction signals from the host computer 24, including:

the print data items (text, images etc) to be printed;

where to print these print data items (alternatively, the processor 22 may determine printing locations itself based on what print data items it receives);

meta data items that are associated with specified locations on the sheet 12, but which are not to be printed;

generic data such as author and date; and the location of the or each memory tag 5 in/on the paper sheet 12 (alternatively, this information can be pre-written to the or each tag or derived by the apparatus scanning the sheet using the device 20 to determine the location of the or each tag 5).

Not all of the above data is required in all cases. The main processor 22 sends command signals as required to:
  the mechanism controller 26;
  the print head 16; and
  the memory tag read/write device 20, to print the print data items where required and to write the print data items, the meta data items and the generic data to the memory tag or tags 5. The processor 22 also causes the read/write device 20 to write location data to the tag(s) 5 as will be more fully explained below.

Thus the sheet 12 is fed through the apparatus 10 and has the required information printed on its upper surface 12A. At the same time the memory tag or tags 5 on or within the paper sheet 12 have the necessary data written to them by the memory tag read/write device 20, with the movement of the memory tag read/write device 20 (and print head 16) being paused with the memory tag read/write device 20 over the or each memory tag 5 as necessary for the data writing to take place.

The manner of co-ordination of the printing and data writing processes will depend on a number of factors. If, for example, the memory tag or tags 5 are only present adjacent the top and/or bottom of the paper sheet 12 then the data writing process can take place before and/or after the printing. This would avoid the necessity for the printing process to be interrupted, and would make the co-ordination simpler. Further, when implemented with an inkjet printer, which in general requires a pause, after printing has been completed before the paper sheet is ejected, to allow the ink to dry, the data writing process could conveniently take place during this pause for memory tags present adjacent the bottom of the paper sheet 12.

To facilitate reading of the memory tag or tags 5 by hand held readers, the or each memory tag 5 can have an icon printed over its locations which can be readily identified by users.

The memory tag read/write device 20 may, in addition to writing the data to the memory tag or tags 5, also conduct a read operation to check that the data has written successfully before the paper sheet 12 is moved on following the data write operation. Alternatively, particularly if the apparatus 10 is operating at high speed, a separate data check device (not shown) may be included in the apparatus such that this operation takes place downstream of a memory tag write device which in this case need not also be capable of data reading.

Figure 5:
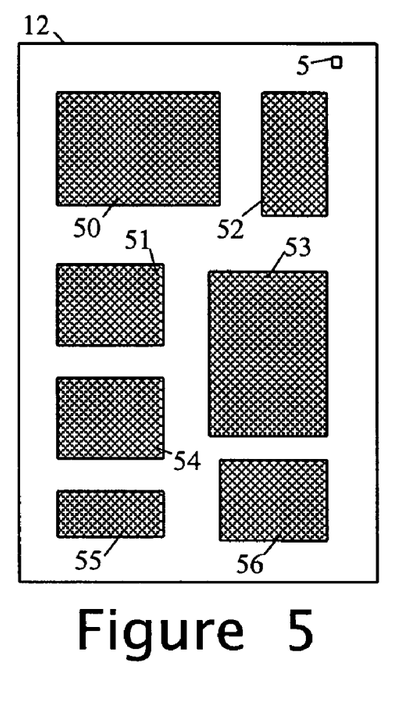
FIG. 5 depicts a first sheet printed and written to by the FIG. 1 apparatus, the sheet being provided with a single memory tag.
Figure 6:
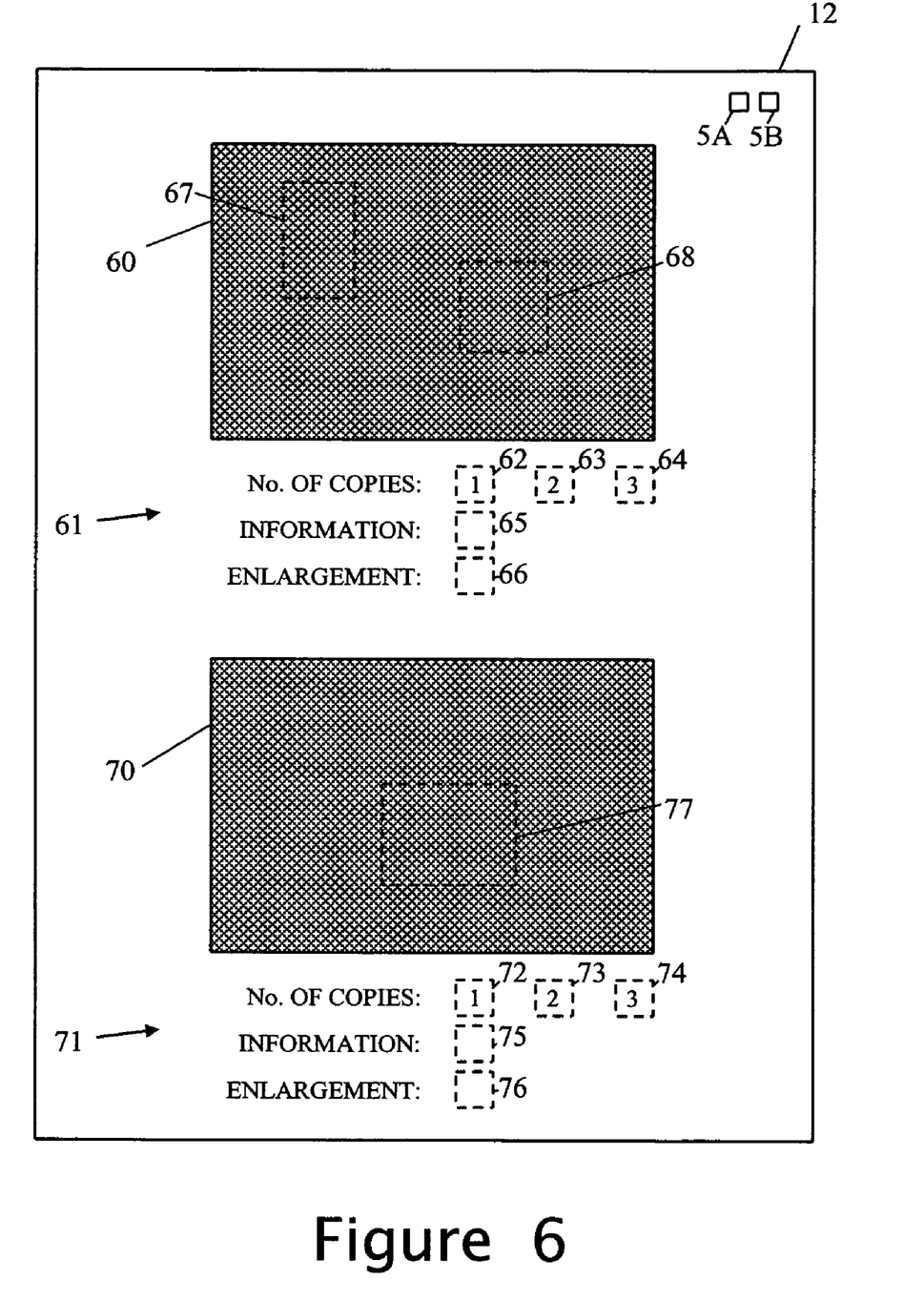
FIG. 6 depicts a second sheet printed and written to by the FIG. 1 apparatus, the sheet being provided with two memory tags.

FIGS. 5 and 6 depict (to different scales) respective examples of sheets 12 printed and written to by the apparatus. The FIG. 5 sheet 12 has seven images 50 to 56 printed on it and a single memory tag 5 to which the corresponding print data items have been written together with location data delimiting the areas of the sheet 12 occupied by these images; in this example, there are no meta data items. The FIG. 6 sheet 12 carries two printed images 60, 70 with each image having a corresponding instruction block 61, 71 printed below it the purpose of which will be described hereinafter. Associated with the image 60 and its instruction block 61 are a number of meta-data "hotspots", indicated by dashed boxes 62 to 68, which correspond to respective meta data items; the print data items corresponding to image 60 and instruction block 61 are stored in a first memory spot 5A along with the meta data blocks associated with the hotspots 62 to 68 and the locations associated with both the print data items and the meta data items. Similarly, the image 70 and its instruction block 71 have a number of meta-data "hotspots", indicated by dashed boxes 72 to 77, which correspond to respective meta data items; the print data items corresponding to image 70 and instruction block 71 are stored in a second memory spot 5B along with the meta data blocks associated with the hotspots 72 to 77 and the locations associated with both the print data items and the meta data items. The location of the hotspots can be indicated on the printed sheet 12 (for example, by faint lines) but this is not necessary.

Figure 7:
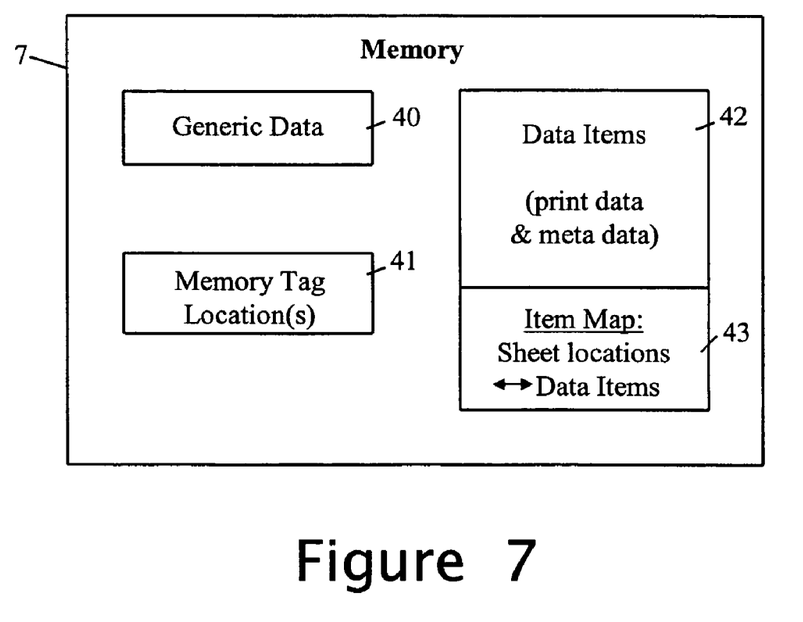
FIG. 7 is a diagrammatic representation of the contents of a memory tag after being written to by the FIG. 1 apparatus.

FIG. 7 depicts the typical contents of the memory 7 of a memory tag 5 after it has been written to by the memory tag read/write device 20. In this example, the contents of the memory 7 is divided into four data blocks 40 to 43.

The data block 40 comprises the generic data provided by the host computer 24 and may additionally include data such as a read-only unique reference ID for the tag itself, tag compatibility information, and manufacturing details.

The data block 41 comprises location data in respect of the memory tags 5 (including the current tag) provided in or on sheet 12; in particular, this data comprises the location of the or each tag relative to the sheet-edge frame of reference. The location of a tag need not necessarily be precisely identified but could simply indicate the general location of the tag concerned (where the tags are subsequently to be read by a hand-held reader, the precise location of a tag is unlikely to be of greater utility than its general location).

The location data comprising data block 41 thus enables a reading device to quickly determine where all other memory tags (if any) are located on the sheet. The location data comprising data block 41 is assembled/determined by the processor 22.

The data block 42 comprises the print data items and the meta data items provided by the host computer 24.

The data block 43 comprises a map that relates areas of the sheet 12 (more particularly, the printed areas and the meta-data hotspots) to specific print or meta data items.

Once the sheet 12 has been printed and written to as described above, it can be used in a variety of ways. By way of example, it will be assumed that the sheet 12 is provided to a person with access to the same or a different instance of the apparatus 10. Thus the sheet 12 can be fed into the apparatus 10 set in "read" mode, and the contents of the or each memory tag 5 in or on the sheet 12 read into a memory portion of the main processor 22 of the apparatus 10. The data can then be passed to the host computer 24; since this data includes an electronic version of the printed matter on the sheet of paper 12, the computer 24 can command the apparatus 10 to produce one or more copies of the original printed data without the need to scan the sheet 12, and hence such copies should be free from the kinds of errors that may be generated by scanning. This may be of particular use where the printed matter is a photograph, which over a period of time may fade, or otherwise deteriorate, such that it cannot be copied adequately by conventional techniques. Furthermore, a print data item read from a tag 5 and sent to the host computer 24 can be altered in some way (for example, by text editing where the print data item is word processed text, or by digital manipulation where the print data item is a digital photograph), the altered data item then being sent back to the apparatus 10 to be printed (and possibly also stored in another memory tag 5 in its altered form).

In the foregoing read operations, where there are multiple memory tags 5 attached to, or embedded in, the sheet 12 (as in the FIG. 6 example), the location data comprising data block 41 of a first accessed memory tag 5 facilitates access to the other memory tags. More particularly, the data block 41 is read by processor 22 using the read/write device 20 and then used to reposition the print-head carriage 16 to enable the other memory tags to be read. Of course, the first-read tag must somehow first be located and this can be done by scanning the read/write device over the sheet starting from one end until a tag is found; alternatively, this first-read tag can be located at a known, standard, position in/on the sheet 12.

The provision of the marking sensor 28 carried by the print-head carriage 16 enables the possessor of the sheet 12 to provide instructions to the apparatus 10 by marking the sheet with sensor-readable markings (for example, a pen with infrared ink can be used to mark the sheet 12, the sensor 28 being arranged to sense the resultant markings). The presence of markings on the sheet 12 can have a predetermined meaning for the apparatus 10 or can be used to refer to a meta data item, stored in a memory tag in/on the sheet, that instructs the apparatus to carry out a particular operation.

Figure 8:
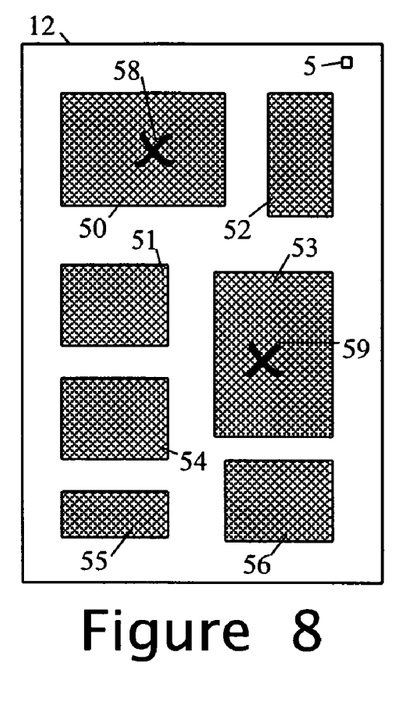
FIG. 8 shows the FIG. 5 sheet with markings added by a user.

For example, FIG. 8 depicts the sheet 12 of FIG. 5 marked with two markings 58, 59 on respective ones 50, 53 of the images; in this case, the apparatus on presentation with the sheet 12, scans the sheet with its read/write device 20 and its sensor 28 both to detect and read the memory tag 5, and to detect the markings 58 and 59 and their location. The processor 22, upon determining from the data read from the tag 5 that there are no meta data hotspots defined for this sheet but that the markings 58 and 59 correspond to the images 50 and 53, is arranged to interpret the markings 58 and 59 as requests for separate print outs of the images 50 and 53. The processor 22 accordingly controls the apparatus to produce the requested prints. These prints can be made on respective sheets each with its own memory tag to which the print data item for the image printed on the sheet is written. The apparatus can be further arranged to also print out a fresh version of the unmarked sheet 12 (that is, in the form depicted in FIG. 5).

Figure 9:
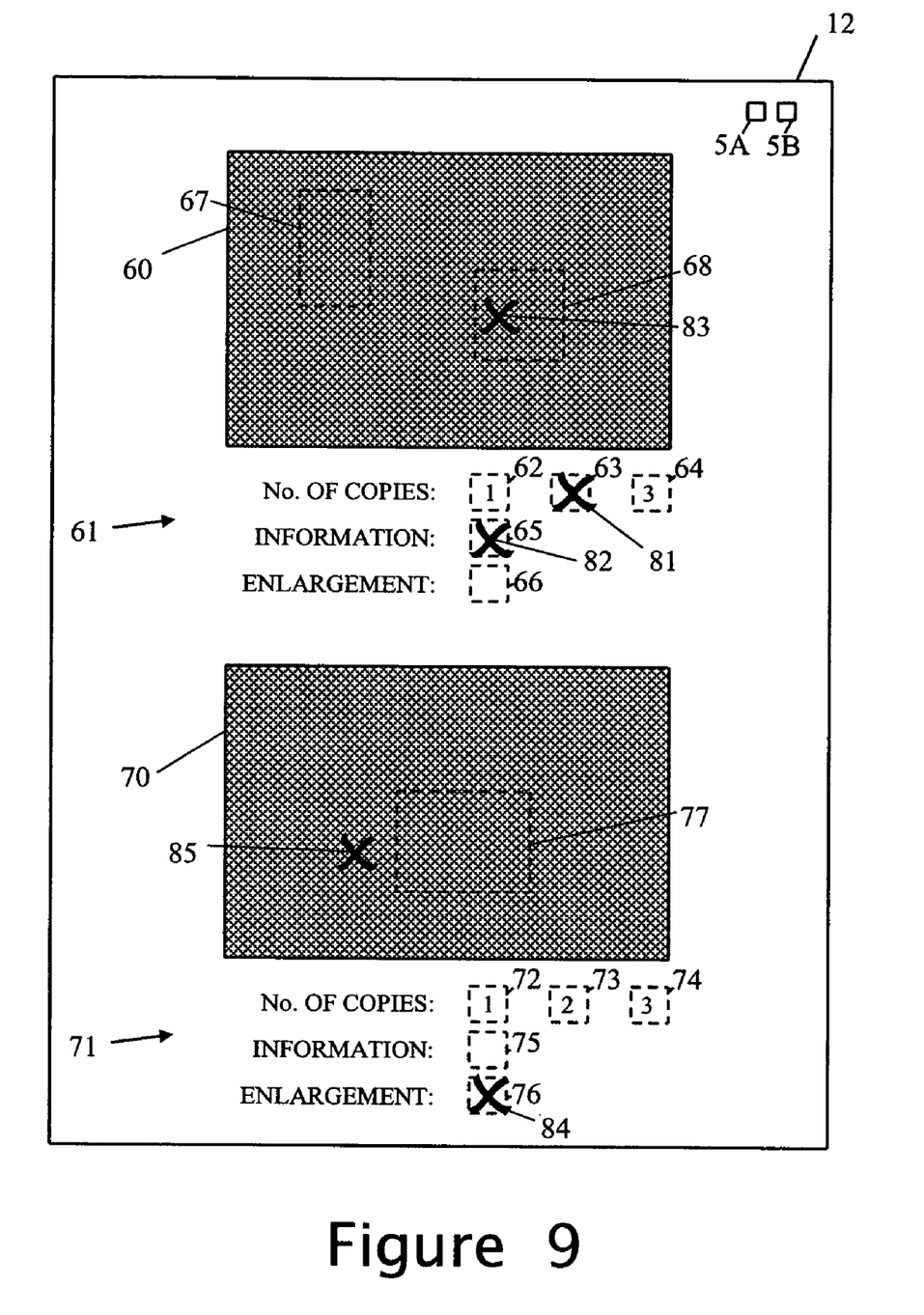
FIG. 9 shows the FIG. 6 sheet with markings added by a user.

A more complex usage of markings involving activation of meta data instructions is depicted in FIG. 9 where the sheet 12 of FIG. 6 is shown marked up with a number of markings 81 to 85 detectable by the sensor 28. Thus, in respect of the image 60, the instruction block 61 has been marked with markings 81 and 82 at locations respectively corresponding to hotspots 63 and 65, and the image 60 has itself been marked with a further marking 83 corresponding to hotspot 68. With regard to image 70, the instruction block 71 has been marked with marking 84 corresponding to hotspot 76, and the image 70 has itself been marked with a further marking 85 that does not correspond to any hotspot.

When the FIG. 9 sheet 12 is fed into the apparatus and scanned, the data held in the memory tags 5A and 5B is read off into a memory of the processor 22 and the locations of the markings 81 to 85 are determined. The processor 22 interprets these markings as follows:

Marking 81 is determined by its location to correspond to the meta data item associated with hotspot 63 of the instruction block 61 of image 60. This meta data item is an instruction to print two copies of image 60 and the processor 22 accordingly commands the apparatus to print these copies.

Marking 82 is determined by its location to correspond to the meta data item associated with hotspot 65 of the instruction block 61 of image 60. This meta data item is an information object containing information about the image 60 in general. The processor 22 interprets marking 82 as a request for output of the information in the corresponding information object and the processor 22 accordingly outputs this information in any suitable manner (for example, by printing it, though other forms of output—such as visual output on a display device, or audio output via text-to-speech converter—are also possible). The processor 22 further interprets the marking 82 as an instruction to determine whether any marking on the image 60 corresponds to the hotspot of an information meta data item; if so, the information held by that object is also output (this information will generally be information specific to the feature of image 60 that corresponds to the hotspot concerned).

Marking 83 is determined by its location to correspond to the meta data item associated with hotspot 68 within the area of the image 60; in the present example, this object is an information object. In view of the marking 82 indicating that marked information objects of image 60 are to be output, the processor 22 outputs the information held by this object (again, in any suitable manner).

Marking 84 is determined by its location to correspond to the meta data item associated with hotspot 76 of the instruction block 71 of image 70. This meta data item is an instruction to print an enlargement of image 70 with any marking within the area of image 70 to be interpreted as indicating the centre of this enlargement (unless the marking has already been interpreted as indicating an information object to be output). Absent any marking indicating the centre of enlargement, the image 70 will be enlarged about its centre point. In the present example, marking 85 indicates the centre of enlargement. The processor 22 is operative to respond to the markings 84 and 85 to print out an enlargement of image 70 centred on the point indicated by marking 85.

Marking 85 is, as explained above, interpreted by processor 22 as the centre of enlargement of the image 70.

Many variations are, of course, possible to the above-described apparatus. For example, the inductive coil L2 of the memory tag read/write device 20 can be incorporated into the print head itself; in this case, the axes A2 and A3 will be coincident. Although the print head 16 is described as being of ink jet form, other forms of print head, and indeed other forms of printer, can be used. For some forms of printer it may be appropriate for the memory tag read/write device 20 to be moveable independently of the print head 16 rather than these units being connected together for movement as one. In this alternative embodiment of apparatus, the memory tag read/write device 20 is mounted on a read/write device carriage for independent movement along the axis A3, this carriage being located either upstream or downstream of the print head carriage 18; the mechanism controller 26 is arranged to position the read/write device carriage relative to the frame of reference established by the edges of the sheet 12 in the same manner as described above for the print-head carriage. In other forms of the printer, the print head 16 spans the width of the sheet 12 and does not move side to side in order to achieve the necessary print coverage. This form of printer therefore does not include a print carriage. This embodiment might involve laser printers, and other forms of printing technology, in which the print heads are fixed within the apparatus and do not move relative to the base medium or other wise. A memory-tag read/write device carriage would, however, still be provided and the sensor 28 would be mounted on this carriage.

Of course, other arrangements as possible for positioning the print head 16 and/or device 20 and/or sensor 28 at a desired location relative to the sheet 12. Thus, for example, instead of the sheet 12 and [print head 16/device 20/sensor 28] being moveable in respective orthogonal directions as in the apparatus of FIGS. 1 and 2, means can be provided to displace one of the sheet 12 and [print head 16/device 20/sensor 28] in two orthogonal directions whilst the other of the sheet 12 and [print head 16/device 20/sensor 28] is kept stationary.

Rather than using the edges of the sheet for establishing a frame of reference for positioning elements of the apparatus 10 (in particular, the print head 16 and/or the read/write device 20, and/or the sensor 28) over the sheet 12, other frames of reference can be used. For example, it would be possible to print the sheet with a positioning grid or pattern that is readable by a suitable sensor mounted on the or each element-mounting carriage; suitable positioning patterns are well known in the art (see, for example, WO-A-01/26032, Anoto AB). The positioning pattern could be provided pre-printed on the sheet 12 or could be printed by the print head 16 (though in this case it will typically still be necessary to use the sheet edges and the drive mechanism scaling factors to determine where to print the pattern). A further possibility for establishing a frame of reference for positioning is to use the location of a memory tag 5 embedded in, or attached to, the sheet 12 as the origin point of the frame of reference, the drive mechanism being calibrated to provide measures of displacement from this origin along axes defined by the mechanics of the apparatus and the orientation of the sheet. The sheet orientation will often be determined by the sheet edges abutting reference guides. However, since these edges could be damaged over time, it is preferable to provide some way of defining sheet orientation independently of the sheet edges. A number of ways of doing this are possible; for example, the sheet could initially be printed with markings defining axes (typically orthogonal axes) or the memory tag could be printed or physically formed with orientation markings that the apparatus could detect and use to orient the sheet 12 correspondingly. Alternatively, two or more memory tags could be positioned in or on the sheet such as to define sheet orientation, the apparatus again being arranged to orient the sheet 12 correspondingly or to computationally adjust for the orientation of the sheet.

Though in most embodiments the frame of reference used for sheet locations will not have its origin point coincident with the location of a memory tag, it is still possible for the location data stored by a memory tag to specify locations on the sheet relative to its own location. Thus, for example, the location data of the item map comprising the data block 43 of a memory tag, can specify the data item locations relative to the location of the tag storing the data.

Rather than the memory tag(s) being embedded in, or attached to, the sheet 12 prior to the sheet being introduced into the apparatus, it is possible to arrange for the apparatus to have a supply of memory tags with the apparatus first writing data to a tag before adhering it to the corresponding sheet, typically after it has printed the latter.

Figure 10:
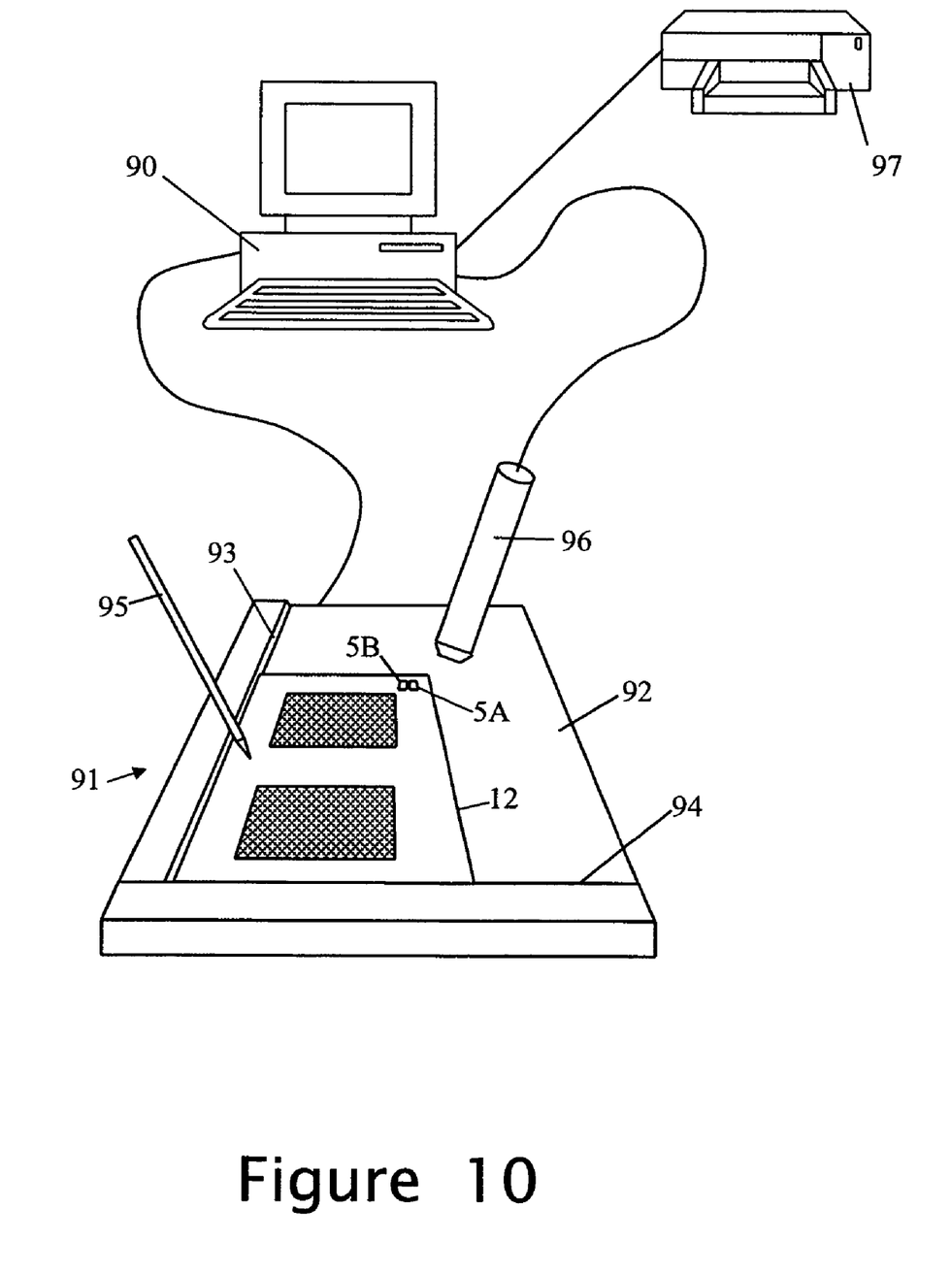
FIG. 10 illustrates an alternative arrangement for enabling a user to interact with a previously printed/written-to sheet.

Although the apparatus 10 has been described as being employed for enabling user interaction with a previously printed/written-to sheet 12, this apparatus is not necessarily the most convenient way of doing so, not least because the described method of interaction involves marking the sheet 12. FIG. 10 illustrates an alternative arrangement in which a general purpose computer 90 (for example, a desktop or laptop computer) is connected to a graphics tablet 91, a hand-held memory-tag reader 96 and a standard printer 97. The graphics tablet is of standard form with a pressure sensitive surface 92 on which a printed sheet 12 (with memory spots 5A, 5B) is placed up against positioning reference edges 93, 94. The reader 96 is used to read data from the memory tags 5A, 5B into the computer 90. A stylus 95 is used to select particular points on the printed sheet by pressing down on the sheet at the appropriate locations. The position coordinates of each selected point are passed by the graphics tablet to the computer 90 which uses these coordinates to determine what action to take (potentially including printing to printer 97) in the manner described above with reference to FIGS. 8 and 9 and the apparatus 10.

Other ways of receiving user input associated with specific locations on a sheet 12 are also possible. For example, a reader such as the hand-held reader 96 of FIG. 10 can be used to read the data from the memory tag(s) of the sheet into a computer; the sheet is then displayed on the screen and points on the sheet are thereafter selected by a user using an input device (such as a mouse or the touch-sensitive overlay of a touch-sensitive screen) to indicate screen positions which are then translated to positions on the displayed sheet image.

It will also be appreciated that the memory tag(s) of a sheet can be written to by memory-tag write devices independent of the apparatus 10. Thus, for example, where a sheet has multiple embedded memory tags 5, the sheet-referenced locations of these tags can be written into the tags in advance of the sheet being presented to the apparatus (for example, the data blocks 41 could be written as part of the manufacturing process for the sheet).

The above embodiments have been described as appropriate for use with loose sheets 12. However, embodiments can also be constructed for use with other base media, for example paper in fan fold or roll form, or indeed boxes or other objects (the term "base medium" in this context simply referring to the portion of the object not constituted by the memory tags).

In the above-described embodiments the memory tags 5 have all used RFID technology. However, it is also possible to use memory tags which operate at other frequencies, outside the radio frequency range.

The invention claimed is:

1. A physical object comprising a base medium with a memory tag embedded in it or attached to it, the memory tag storing at least one data item and two-dimensional location data relating each of one or more areas on a two-dimensional surface of the physical object to the at least one data item stored by the memory tag and arranged for the at least one data item stored therein to be interrogated by incident electromagnetic radiation, wherein the at least one data item is at least one print data item representing data printed on said two-dimensional surface of the physical object.

2. The physical object according to claim 1, wherein at least one data item stored by the memory tag is a meta data item representing an instruction to be acted upon in response to user selection of the corresponding area of the two-dimensional surface of the physical object.

3. The physical object according to claim 1, wherein the base medium is in the form of a sheet.

4. The physical object according to claim 3, wherein the base medium comprises a single sheet of paper.

5. The physical object according to claim 1, wherein the base medium is a sheet of paper.

6. The physical object according to claim 1, wherein the memory tag is powered by the electromagnetic radiation incident on the memory tag.

7. An apparatus comprising a memory-tag writing device for writing data to a memory tag by applying electromagnetic radiation incident on the memory tag, wherein the memory tag is embedded in or attached to a base medium of a physical object or that is to be so embedded or attached, and a control processor to collect and organize data for writing by the memory-tag writing device; wherein the control processor is to collect and organize both at least one data item and related location data that associates the at least one data item to a corresponding area on a two-dimensional surface of the physical object, the control processor is further to control the writing of the at least one data item and location data to the memory tag, wherein the at least one data item is at least one print data item representing data printed on said two-dimensional surface of the physical object.

8. The apparatus according to claim 7, further comprising a printing assembly for printing said print data item onto said two-dimensional surface of the base medium of the physical object in correspondence to the at least one data item written, or to be written, by the memory-tag read/write device to the memory tag.

9. The apparatus according to claim 7, wherein the memory tag is a radio frequency identification tag and wherein the electromagnetic radiation applied by the memory-tag read device is radio frequency electromagnetic radiation.

10. The apparatus according to claim 7, wherein the physical object is a sheet of paper.

11. An apparatus comprising:
- a memory-tag read device for reading at least one data item and location data from a memory tag embedded in or attached to a base medium of a physical object presented to the apparatus by applying electromagnetic radiation incident on the memory tag, the location data relating each of one or more areas on the surface of the object to at least one data item stored by the memory tag, wherein the at least one data item is at least one print data item representing data printed on said two-dimensional surface of the physical object;
- a user input arrangement to receive user input indicative of a user-selected position on the object; and
- a control arrangement to use the location data read by the read device to identify the at least one data item corresponding to a user-selected position indicated by user input to the user input arrangement.

12. The apparatus according to claim 11, wherein the control arrangement is to cause the identified at least one data item to be passed to a display device.

13. The apparatus according to claim 11, wherein the control arrangement is to cause the identified at least one data item to be passed to a printer.

14. The apparatus according to claim 11, wherein the control arrangement is arranged to read the identified at least one data item and perform a task indicated thereby.

15. The apparatus according to claim 14, wherein the control arrangement is to carry out said task in relation to a further one of the at least one data item that is referenced by the identified at least one data item.

16. The apparatus according to claim 14, wherein the control arrangement is to carry out an enlargement task indicated by the identified at least one data item, wherein the control arrangement is to carry out the enlargement task with a center of enlargement as indicated by a further user-selected position input through the user input arrangement.

17. The apparatus according to claim 11, wherein the user input arrangement comprises a display to display a graphical representation of the physical object, and a pointing device to select a position on the displayed representation of the physical object.

18. The apparatus according to claim 11, wherein the user input arrangement comprises a graphics tablet to receive the object and determine a position on the physical object pointed to by the user using a stylus.

19. The apparatus according to claim 11, wherein the user input arrangement comprises a sensor arrangement to detect a mark placed on the object by the user and determine the position of the mark.

20. The apparatus according to claim 11, wherein the memory-tag read device is a hand-held reader.

21. The apparatus according to claim 11, further comprising a positioning assembly to move the memory-tag read device and physical object relative to each other to position the read device at the memory tag.

22. The apparatus according to claim 11, wherein the physical object is a sheet of paper.

* * * * *

UNITED STATES PATENT AND TRADEMARK OFFICE
CERTIFICATE OF CORRECTION

PATENT NO. : 8,205,799 B2
APPLICATION NO. : 11/035802
DATED : June 26, 2012
INVENTOR(S) : Robert Francis Squibbs et al.

It is certified that error appears in the above-identified patent and that said Letters Patent is hereby corrected as shown below:

In column 12, line 2, in Claim 14, after "arrangement is" delete "arranged".

Signed and Sealed this
Twenty-second Day of January, 2013

David J. Kappos
*Director of the United States Patent and Trademark Office*